Jan. 27, 1953 W. A. GIBBONS ET AL 2,626,650
SIDE WALL ACTUATED TIRE PUMP
Filed Sept. 25, 1948 2 SHEETS—SHEET 2
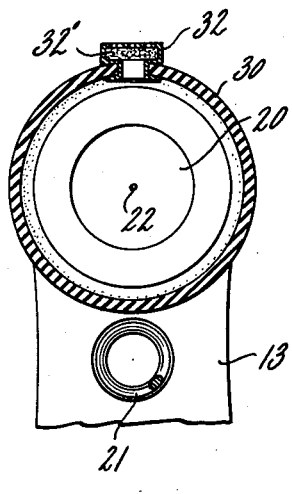
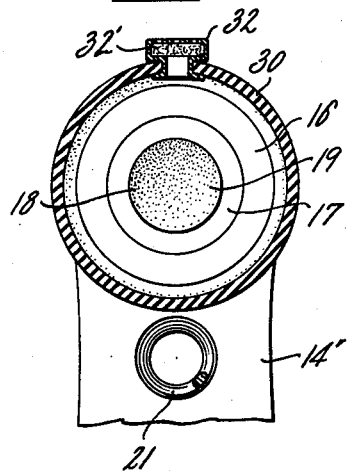
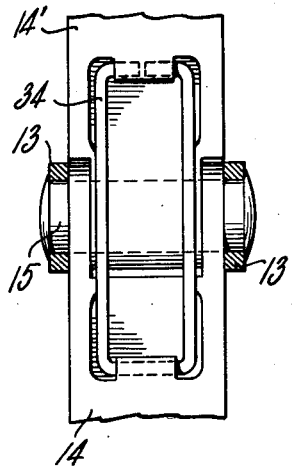
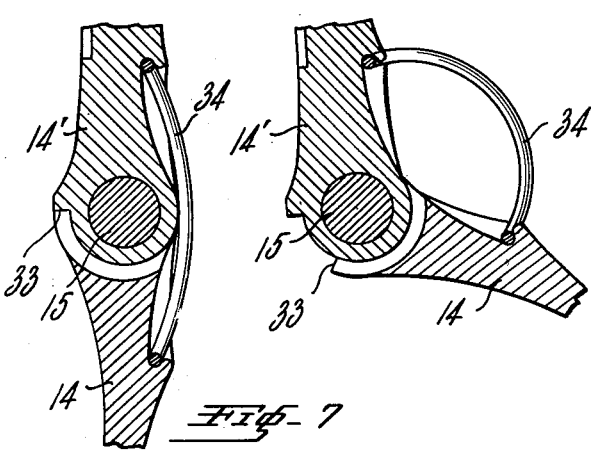
INVENTORS
WILLIS A. GIBBONS
THOMAS J. RHODES
BY
Charles E. Willson
ATTORNEY Patented Jan. 27, 1953

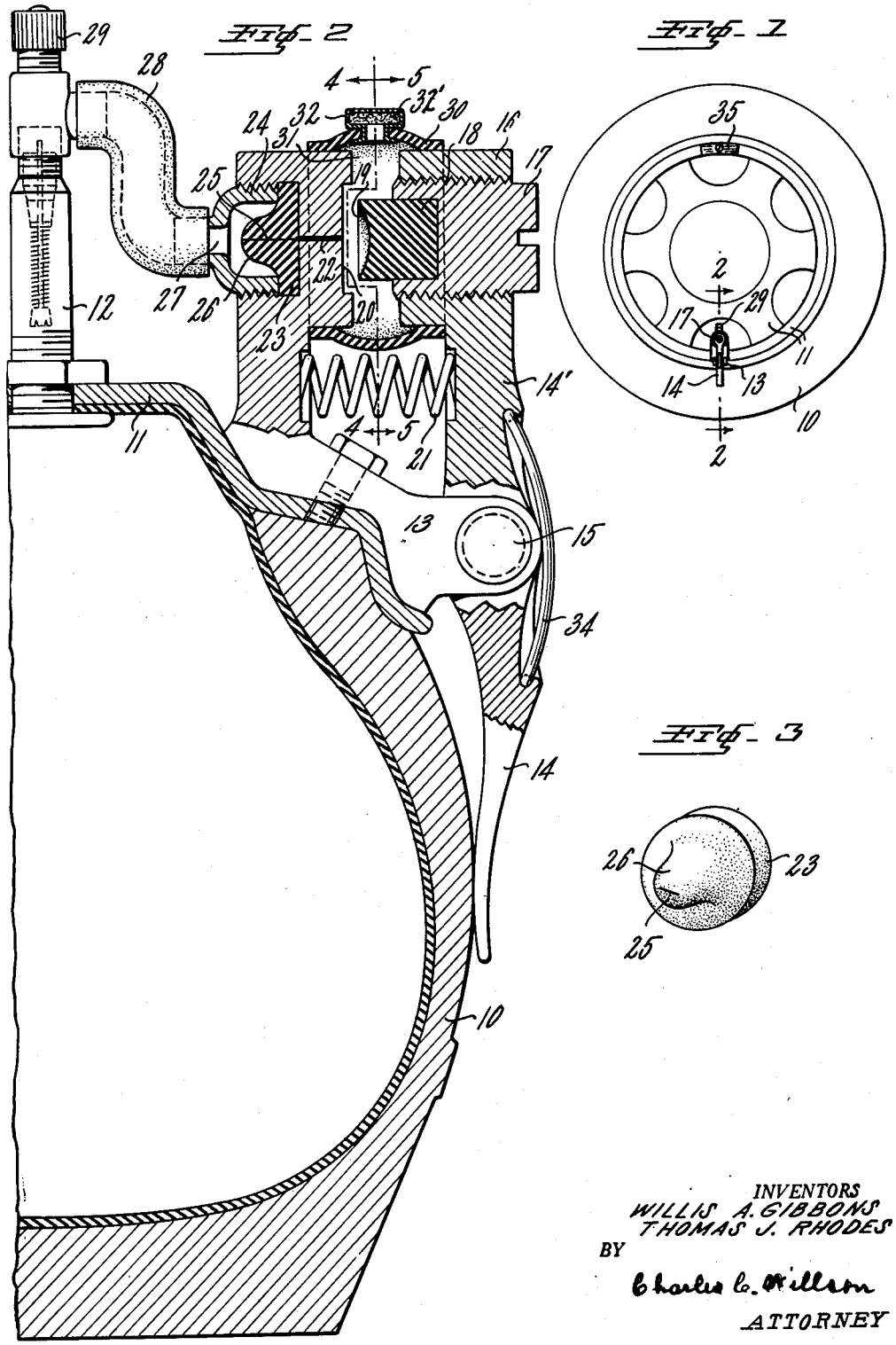

2,626,650

UNITED STATES PATENT OFFICE 2,626,650

SIDE WALL ACTUATED TIRE PUMP

Willis A. Gibbons, Montclair, and Thomas J. Rhodes, Clifton, N. J., assignors to United States Rubber Company, New York, N. Y., a corporation of New Jersey Application September 25, 1948, Serial No. 51,268

3 Claims. (Cl. 152—419)

This invention relates to improved inflating means for automatically maintaining the desired air pressure in pneumatic tires, and more particularly to an improved sidewall-actuated inflating means having a pump which has an extremely small stroke, but nevertheless is capable of delivering air at a relatively high pressure.

As is well known, it is injurious to pneumatic tires to run them at an inflation pressure less than the pressure for which they are designed. It has therefore been proposed heretofore to provide means for preventing the under-inflation of tires which occurs in ordinary usage due to failure to service the tire or due to slow leaks.

It has previously been suggested to maintain the desired air pressure in pneumatic tires by means of inflating mechanisms actuated by the repeated outward deflection of the sidewall of the under-inflated tire as the tire revolves. However, the devices proposed for this purpose have not been satisfactory for certain reasons, including the fact that the mechanisms were not adapted to deliver air at the required pressure with the very small effective stroke length inherent in pumping mechanisms actuated by the slight deflection of the sidewall of the tire.

It is a principal object of this invention to provide means, actuated by the slight deflection of the sidewall of an under-inflated tire, which means is capable of delivering air at the required pressure.

This and other objects which will appear in the detailed description below are accomplished by utilizing the deflection of the under-inflated tire sidewall to move an air displacing member of rubber or similar resilient material, having a small cup or air pocket on its leading face, against a surface having a fine air delivery opening therein, so as to collapse the cup against said surface and thus force the air from the cup into the air delivery opening. The air delivery opening is provided at its opposite end with a normally closed one-way rubber valve comprising a disc of rubber having an outward extending bulge and having a small axial slit at its center leading from the air delivery opening. The air passes out of the air delivery opening through this valve when the pressure becomes sufficiently high. An air passageway connects this valve to the conventional air inlet valve on the tire.

Such an inflating device, unlike conventional piston pumps and the like, is capable of delivering air at a relatively high pressure, e. g., 100 p. s. i., with an extremely small stroke, e. g., $\frac{1}{16}$″, and thus is capable of inflating even heavy duty truck tires by the deflection of the tire sidewall. A principal feature of the present inflating means which makes the delivery of air at high pressure possible with such a small stroke is that the volume of air contained in the fine air delivery opening is small compared to the displacement volume of the inflating device represented by the effective volume of the rubber cup. The length of stroke required to operate the inflating device need be only slightly greater than the depth of the rubber cup, which is very shallow. This design permits of very high volumetric efficiency, i. e., nearly all of the air displaced by the rubber cup actually passes through the valve because of the smallness of the volume of the air delivery opening between the cup and the valve, compared to the effective volume of the cup.

The structure and operation of the tire inflating pump of this invention, and the advantages thereof, will be further understood from the following detailed description when read in conjunction with the accompanying drawings, wherein:

Fig. 1 is a side elevational view of a pneumatic tire and wheel, with the sidewall deflection actuated pump of this invention mounted thereon;

Fig. 2 on a larger scale is a sectional view taken on the line 2—2 of Fig. 1;

Fig. 3 is a detail in perspective of the rubber check valve of the pump;

Fig. 4 is a view of part of the pump of Fig. 2, taken along the line 4—4 of Fig. 2 and looking in the direction indicated by the arrows 4—4;

Fig. 5 is a similar view but looking in the direction indicated by the arrows 5—5 of Fig. 2;

Fig. 6 is a more detailed side elevation of part of the pivoted arms that actuate the pump; and Figs. 7 and 8 are front elevations in section of part of the actuating arms.

Referring to Figs. 1 and 2, a conventional pneumatic tire 10 is mounted on a wheel rim 11, which has a standard valve stem 12 for admitting air to the tire. The automatic inflating mechanism is carried by a supporting bracket 13 which is rigidly attached to the wheel rim. An actuating lever formed of the pivotally connected arms 14 and 14′ is secured by the pivot pin 15 to ears that project outwardly from the bracket 13. The arm 14 of this lever is curved outwardly in the area of contact with the sidewall of the tire as shown. The other end of the pivoted lever formed of the arm 14′ has a threaded member 16 in which is mounted an adjustable screw 17 (Fig. 2). This adjusting screw carries a rubber air-compressing member 18 which has an air cup or depression 19 on its leading surface. The reciprocating motion imparted to this rubber cup by the actuating arm 14' causes the cup 19 to be pressed against a stationary surface 20 of the bracket 13, whenever the deflection of the tire sidewall exceeds a predetermined amount, that is, whenever the tire is running under-inflated. The actuating arm 14 is forced against the tire sidewall by a compression spring 21 at all times. As the cup 19 is pressed against the fixed surface 20 the air in the cup is displaced at high pressure into a pin hole or air delivery opening 22 of the bracket 13 (Fig. 4), which hole has a very small volume compared to the effective volume of the rubber cup. The air delivery opening leads to a normally closed one-way rubber valve 23, consisting of a disc of rubber which is held tightly against the air delivery opening by a threaded retaining ring 24. The air passageway of this valve consists of a fine slit 25 in the center of the rubber disc which engages the air delivery opening 22. The outer surface of the disc has an outward bulge 26 (Fig. 3). The ring 24 cooperates with the bracket 13 to form a casing having a pressure chamber therein in which the bulge 26 projects, and air passes out of this chamber through the passageway 27 within the ring 24. The valve remains tightly closed when the air pressure in the passageway 27 is higher than the pressure in the air delivery opening 22. When the rubber cup is pressed against the surface 20 the air pressure in the air delivery opening will exceed the pressure in the passage 27, and the slit 25 will open to permit the air to pass out of the cup and out of the air delivery opening into the tire through the passage 27, a connecting hose 28, and the valve stem 12.

The valve stem 12 has a sealing cap 29 which may be removed when it is desired to deflate the tire or inflate the tire with a conventional air compressor.

Dirt and other foreign material are prevented from entering the air passages of the pump by a rubber sealing bellows 30 connected from the reciprocating part 16 of the arm 14' to the stationary bracket 13 and forming a sealed chamber 31 around the rubber cup. This bellows may be fitted on with sufficient looseness to permit air to enter the chamber 31 from the outside, but with sufficient tightness to prevent the passage of foreign material. The bellows however preferably is provided with a porous section such as a small perforated metal cap 32 which may contain a material to filter incoming air such as a porous wad 32'.

The actuating arms 14 and 14' are pivotally connected by the pin 15 and their pivotal movement in one direction is arrested by the stop 33 as shown in Figs. 7 and 8. A strip of spring material, such as a wire spring 34, which serves as an overload spring to spread the arms 14, 14', is suitably attached to each of these arms across the joint at the pivot pin 15. This spring is sufficiently stiff to permit the actuating lever formed of the arms 14, 14' to move as a unit under the influence of the ordinary deflections of the sidewall. However, when the deflection of the sidewall is excessive, as when the tire strikes a rock or a bump, the overload spring 34 bulges outwardly as shown in Fig. 8 permitting the actuating arms to bend at the joint, and relieve the excess stress which would otherwise damage the lever or injure the tire.

It should be noted that the actuating arm 14 is curved outwardly away from the sidewall at the point of contact with the sidewall, so that there is no rubbing action between the tire and the arm. If desired a pad (not shown) may be provided on the sidewall at the point engaged by the arm 14.

A counterbalancing weight 35 (Fig. 1) may be fastened to the opposite side of the wheel 11.

From the foregoing it is evident that when the tire loses sufficient air so that the deflection of the sidewall exceeds a determined amount, depending on the setting of the adjusting screw 17, the rubber cup 19 will begin to press against the surface 20 as the tire revolves thus delivering air through the air delivery opening 22 and the rubber valve 23, into the passage 27 and connecting pipe 28, and thence through the valve stem 12 into the tire, until the pressure is restored to the desired amount. When the tire is inflated to the desired pressure, the deflection of the sidewall will be too small to cause the rubber cup 19 to engage the surface 20 with a pumping action, with the result that the pressure delivered by the pump is automatically self-limiting to the desired inflation pressure. In the same way, if the load on the vehicle is increased, thus producing a greater sidewall deflection than is desirable, the pump will automatically increase the pressure of the tire to provide the desired inflation. When the load is removed from the vehicle the normal loss of air from the tire will gradually restore the desired reduced pressure. If desired, an over-pressure relief valve (not shown) of known construction may be incorporated in the system to limit the maximum air pressure.

The pumping mechanism of this invention, which is of very simple and durable construction, differs from the pumps previously suggested for this purpose in that it does not require any accurately machined parts and does not require any lubrication. Unlike the prior pumps, the interior of this pump is adequately protected from dirt, water, mud, ice, etc. by the rubber sealing bellows 30.

As previously noted, the pump of this invention is capable of delivering air at high pressures, e. g., 100 p. s. i. with a small effective stroke, e. g., $\tfrac{1}{16}''$, because of its high volumetric efficiency, which is obtained independently of any accurately machined parts fitted to close tolerances. The high volumetric efficiency of the pump is due to the high ratio of the volume of the air delivered by the rubber cup 19 when it is collapsed positively and completely against the surface 20, compared to the volume of air contained in the small delivery passage 22, as well as to the rubber check valve employed. In a conventional piston pump having a ball check valve, the ratio of the volume of air delivered with a short stroke to the volume of air contained between the ball check valve seating and the cylinder is low. Therefore when it is attempted to deliver air at high pressure with such a pump, the small movements of the piston will simply compress the air in the space around the ball valve seating without actually delivering the air to the tire.

It is evident that the device of this invention is superior to various proposed inflating devices which are designed to be placed inside the tire, since such devices require special tire construction and cause wear on the tire.

Having thus described our invention, what we claim and desire to protect by Letters Patent is:

1. An air pump for maintaining the pressure in a pneumatic tire on a wheel while the wheel is running, said pump having a small casing connected with the interior of the tire and having a wall through which a small aperture is provided leading into the casing, a one-way valve cooperating with said aperture, a bracket for supporting the pump on the wheel, a pump actuating lever, a spring for urging the lever against a side wall of the tire, and means for forcing air under many pounds of pressure through said aperture and valve into said casing and tire, comprising a rubber block operated by said lever to engage the outer surface of the wall and having a shallow compressible air cup provided with a thick peripheral edge that is stiff enough to keep the air in the cup from escaping around its edge as the cup is flattened against said surface by the lever movement to force air through said aperture and valve.

2. An air pump for maintaining the pressure in a pneumatic tire on a wheel while the wheel is running, said pump having a small casing connected with the interior of the tire and having a wall through which a small aperture is provided leading into the casing, a one-way valve cooperating with said aperture, a bracket for supporting the pump on the wheel, a pump actuating lever formed of two lever arms and an overload spring acting between the arms, a spring for urging one arm of the lever against a side wall of the tire, and means for forcing air under many pounds of pressure through said aperture and valve into said casing and tire, comprising a rubber block operated by the other arm of said lever to engage the outer surface of said wall and having a shallow compressible air cup provided with a thick peripheral edge that is stiff enough to keep the air in the cup from escaping around its edge as the cup is flattened against said surface by the lever movement to force air through said aperture and valve.

3. An air pump for attachment to the rim of a wheel having a pneumatic tire thereon, for maintaining the air pressure in the tire while the wheel is running, comprising a bracket, a lever pivoted intermediate its ends on the bracket for rocking movement actuated by deflection of the sidewall of the tire, a spring for urging one arm of the lever against the tire, a rubber block operated by the other arm of the lever for intermittent engagement with a wall of the bracket, said block having a shallow cup-shaped depression in the face adjacent to said wall and having a wide rim surrounding the depression that is airtight and unyielding enough to prevent air under pressure in the cup from escaping past the rim when the cup is flattened against the wall surface by the lever movement, said wall having a fine perforation extending through it from one face to the other, one end of the perforation being inside of the area engaged by the rubber block so as to communicate with said depression, a one-way valve adjacent to and having its inlet opening in register with the other end of said perforation, and a tube for tightly connecting the outlet of said valve with the valve stem of the tire.

WILLIS A. GIBBONS.
THOMAS J. RHODES.

REFERENCES CITED

The following references are of record in the file of this patent:

UNITED STATES PATENTS

| Number | Name | Date |
|---|---|---|
| 715,094 | Langton | Dec. 2, 1902 |
| 1,182,536 | Dunn | May 9, 1916 |
| 1,228,610 | Shults | June 5, 1917 |
| 1,756,678 | Cumming | Apr. 29, 1930 |
| 2,308,955 | Wilson et al. | Jan. 19, 1943 |